(No Model.)
B. PORTER.
NUT LOCK.
No. 500,672.
Patented July 4, 1893.
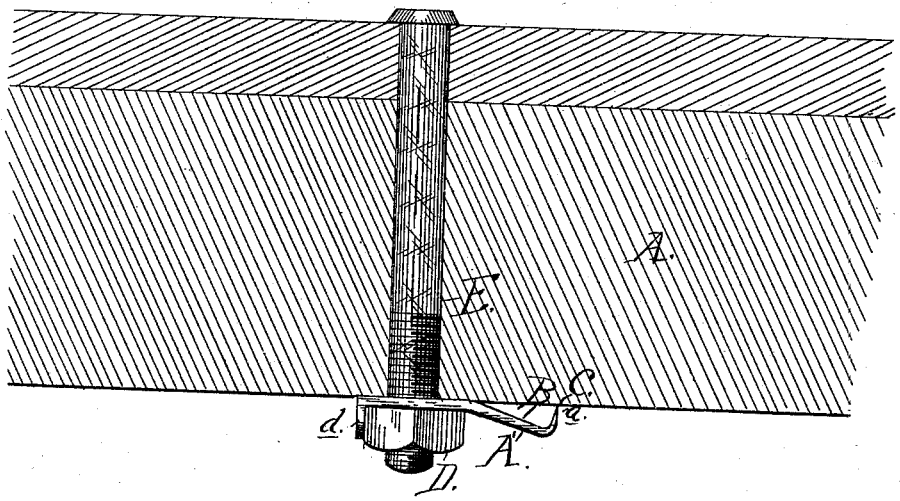
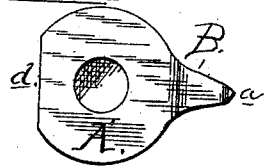
WITNESSES
Thos. J. Rout, Jr.
M. M. Evans.
Benjamin Porter
INVENTOR
By A. H. Evans & Co.
Attorneys

UNITED STATES PATENT OFFICE.

BENJAMIN PORTER, OF FULLERTON, NORTH DAKOTA.

NUT-LOCK.

SPECIFICATION forming part of Letters Patent No. 500,672, dated July 4, 1893.

Application filed January 19, 1893. Serial No. 458,973. (No model.)

*To all whom it may concern:*

Be it known that I, BENJAMIN PORTER, a citizen of the United States, residing at Fullerton, in the county of Dickey and State of North Dakota, have invented certain new and useful Improvements in Nut-Locks, of which the following is a full and clear description, reference being had to the accompanying drawings forming part of this specification, in which—

Figure 1, represents a side elevation of my improved nut-lock, as applied to a bolt and wooden bar. Fig. 2, is a side view of the washer detached. Fig. 3, is a plan view of the same.

My present invention relates to an improvement in nut-locks, and consists in the construction and arrangement of a bolt, nut and washer, whereby the nut becomes perfectly locked so that in no way can it become accidentally loose.

In the figures, the washer A' is made of a plate of metal with a hole of such size as to fit the bolt E. One end of the washer A', projects some distance beyond the edge of the nut, forming an arm B which is bent up at its free end, and sharpened at its point, a, so as to be capable of being driven into the wooden bar A, as at C. The opposite end d of the washer, is turned down closely to the side portion of the nut D, as shown in Fig. 1, by which means it forms a complete nut-lock. When the bolt E has been inserted into its place, the washer A' is placed thereon. Then the nut D is placed on the bolt, and the washer and the nut being screwed up tight in position, the pointed projecting pin a of the washer is forced or driven upwardly into the timber. Now it can be readily seen that it will be impossible to turn the nut D from its place without first withdrawing the projected end d of the washer back again, out of contact with the wood. Therefore the nut cannot work loose, accidentally.

Having thus described my invention, what I claim as new, and desire to secure by Letters Patent, is—

As an improved article of manufacture a washer for a nut lock comprising a plate with a central bolt opening, a lip at one of its edges to engage the side of a nut, and an arm projecting from the opposite edge bent up back beyond the working face of the washer, and its free end sharpened to a point and bent so as to be adapted to be driven in the object through which the bolt passes, substantially as herein described.

BENJAMIN PORTER.

Witnesses:
B. R. CRABTREE,
C. W. PALMER.